US011687862B2

United States Patent
Wu et al.

(10) Patent No.: US 11,687,862 B2
(45) Date of Patent: Jun. 27, 2023

(54) METHOD FOR GUIDING SALES STRATEGY OF LOQUAT FRUITS BY EVALUATING AND PREDICTING QUALITY OF LOQUAT FRUITS

(71) Applicant: ZHEJIANG UNIVERSITY, Hangzhou (CN)

(72) Inventors: Di Wu, Hangzhou (CN); Weinan Huang, Hangzhou (CN); Kunsong Chen, Hangzhou (CN); Yanna Shi, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 17/680,244

(22) Filed: Feb. 24, 2022

(65) Prior Publication Data
US 2022/0292425 A1    Sep. 15, 2022

Related U.S. Application Data

(63) Continuation of application No. PCT/CN2021/105106, filed on Jul. 8, 2021.

(30) Foreign Application Priority Data

Mar. 10, 2021   (CN) .......................... 202110259395.7

(51) Int. Cl.
  *G06Q 10/06*    (2023.01)
  *G06Q 50/02*    (2012.01)
  *G06Q 30/02*    (2023.01)
  *G06Q 10/08*    (2023.01)
  *G01N 1/30*     (2006.01)
  *A23B 7/00*     (2006.01)
  *G06Q 10/0637*  (2023.01)
  *G06Q 10/0639*  (2023.01)
  *G06Q 30/0283*  (2023.01)
  *G06Q 10/0832*  (2023.01)

(52) U.S. Cl.
  CPC ......... *G06Q 10/06375* (2013.01); *A23B 7/00* (2013.01); *G01N 1/30* (2013.01); *G06Q 10/06395* (2013.01); *G06Q 10/0832* (2013.01); *G06Q 30/0278* (2013.01); *G06Q 30/0283* (2013.01); *G06Q 50/02* (2013.01)

(58) Field of Classification Search
CPC .. G01N 1/30; G06Q 10/0832; G06Q 30/0278; G06Q 50/02
See application file for complete search history.

(56) References Cited

FOREIGN PATENT DOCUMENTS

| | | |
|---|---|---|
| CN | 102435594 A | 5/2012 |
| CN | 105675539 A | 6/2016 |
| CN | 107609111 A | 1/2018 |
| CN | 108645839 A | 10/2018 |
| CN | 111402199 A | 7/2020 |
| CN | 112163779 A | 1/2021 |
| CN | 113049588 A | 6/2021 |

OTHER PUBLICATIONS

Li Zhi-Gang, et al., Analysis of Changes on Texture Quality of Fresh-cut Benincasa hispida During Storage, J. Shanxi Agric. Univ. (Natural Science Edition), 2010, pp. 270-273, vol. 30, No. 3.
Cao Xue-Hui, et al., Study on the kinetic model of the quality change during the storage of Dapingding jujube, Science and Technology of Food Industry, 2014, pp. 315-318, vol. 35, No. 4.
Weinan Huang, et al., Morphology and cell wall composition changes in lignified cells from loquat fruit during postharvest storage, Postharvest Biology and Technology, 2019, pp. 1-12, vol. 157, 110975.
Nan Zhu, et al., Label-free visualization of lignin deposition in loquats using complementary stimulated and spontaneous Raman microscopy, Horticulture Research, 2019, pp. 1-13, vol. 6, No. 72.
Song Xiao-Qin, et al., Texture profile analysis of postharvest loquat fruit, Journal of Fruit Science, 2010, pp. 379-384, vol. 27, No. 3.

*Primary Examiner* — Jeffrey P Mornhinweg
(74) *Attorney, Agent, or Firm* — Bayramoglu Law Offices L.L.C

(57) ABSTRACT

A method for guiding a sales strategy of loquat fruits by evaluating and predicting quality of the loquat fruits is provided. The method slices and stains an equatorial plane of an loquat fruit and calculates a lignified cell density P of the equatorial plane of the loquat fruit, so as to guide a current price of a batch of loquat fruits. The current price of the loquat fruits increases as P decreases. The method analyzes a growth stage of the lignified cells and predicts a quality change trend value T of the batch of loquat fruits, so as to guide a storage strategy based on T. The loquat fruits are suitable for storage and transportation when T is high, and the loquat fruits need to be sold as soon as possible when T is low.

7 Claims, 4 Drawing Sheets

METHOD FOR GUIDING SALES STRATEGY OF LOQUAT FRUITS BY EVALUATING AND PREDICTING QUALITY OF LOQUAT FRUITS

CROSS REFERENCE TO THE RELATED APPLICATIONS

This application is the continuation application of International Application No. PCT/CN2021/105106, filed on Jul. 8, 2021, which is based upon and claims priority to Chinese Patent Application No. 202110259395.7, filed on Mar. 10, 2021, the entire contents of which are incorporated herein by reference.

TECHNICAL FIELD

The present invention belongs to an agricultural product detection method, relates to a study method for evaluating quality of the postharvest loquat fruits, and more particularly, relates to a method for guiding a sales strategy of loquat fruits by evaluating and predicting quality of the loquat fruits.

BACKGROUND

Loquat is an evergreen tree native to China. Its fruits mature during the off-season in May, which taste sweet and sour and are popular among consumers. At present, the total cultivation area of loquat in China is nearly 130,000 hectares, with an annual output of about 650,000 tons, accounting for more than 80% of the world's production. Due to the hot and rainy harvest season and the vigorous postharvest physiological metabolism, loquat fruits are prone to postharvest lignification and are extremely perishable during storage and transportation, resulting in serious postharvest loss. In addition, due to the relatively short harvest period, the loquat fruits are prone to seasonal and phased surplus in the market. The vast majority of the loquat fruits are sold in real time, and the sales time and space are narrow, which affects the supply cycle and quality of the loquat fruits, and easily leads to structural imbalances in supply in large producing areas. Therefore, rational use and planning of storage and logistics preservation technology is a direct way to improve the economic benefits of loquat fruits.

The suitable storage conditions and shelf life of loquat fruits change with their varieties and quality grades. The prediction of the quality and shelf life is of great significance for guiding the storage and logistics preservation and sales strategies of loquat fruits. At present, the physiological indicators used to evaluate the lignification of the loquat fruits, such as fruit firmness, lignin content and juice yield, only can reflect the current quality without providing more effective information to predict the future quality trend of the fruits in advance. Predicting the changing trend of the loquat fruits in advance can guide the postharvest storage, transportation, processing and sales of the fruits, so as to maximize the economic benefits of the fruits after harvest.

SUMMARY

An objective of the present invention is to provide a method for guiding a sales strategy of loquat fruits by evaluating and predicting quality of the loquat fruits. The present invention solves the problem that the current evaluation method of loquat fruits only can reflect the current quality state without predicting the future quality change trend in advance. The present invention can evaluate and grade the current quality of loquat fruits, and predict the quality and lignification trend of the loquat fruits during postharvest storage, logistics and shelf life, which is of great significance for guiding the sales strategy of the loquat fruits.

In order to solve the technical problem, the present invention adopts the following technical solution: a method for guiding a sales strategy of loquat fruits by evaluating and predicting quality of the loquat fruits, including the following steps:

step 1: randomly selecting X samples from a batch of loquat fruits, and sequentially numbering the X samples as 1, 2, 3, . . . , X;

step 2: cutting a j-th sample along an equatorial plane, removing half of the fruit and a core, freezing and slicing, staining with phloroglucinol, calculating a number $N_j$ of lignified cells in an entire slice of the equatorial plane, calculating a total area $S_j$ of the equatorial plane of pulp, and calculating a lignified cell density on the equatorial plane as $P_j=N_j/S_j$, where $S_j$ is preferably in square centimeter;

step 3: calculating a radius $R_j^i$ and an equivalent cell wall thickness $D_j^i$ of the $N_j$ lignified cells of the j-th sample, $1 \leq i \leq N_j$, and calculating a lignification trend value of the j-th sample, $T_j = \Sigma_{i=1}^{N_j}(1/N_j * D_j^i / R_j^i)$;

step 4: setting a threshold P' of the lignified cell density, calculating a number X' of samples with $P_j < P'$, and calculating a qualified rate Q=X'/X of the batch of loquat fruits;

step 5: setting a qualified rate threshold Q'; determining that, if Q<Q', the batch of loquat fruits is unqualified and not suitable for sale; and determining that, if Q≥Q', the batch of loquat fruits is qualified, and proceeding with the following steps;

step 6: calculating an average lignified cell density $P = \Sigma_{j=1}^{X}(P_j/X)$ and an average lignification trend value $T = \Sigma_{j=1}^{X}(T_j/X)$ of the batch of loquat fruits; and step 7: guiding a current price of the batch of loquat fruits based on the average lignified cell density P, where the current price of the loquat fruits increases as P decreases; and guiding a storage strategy based on T, where the loquat fruits are suitable for storage and transportation when T is high, and the loquat fruits need to be sold as soon as possible when T is low.

In this solution, this method evaluates the current quality of the loquat fruits based on the lignified cell density, and determines the qualified rate accordingly. On the basis of the qualified batch of loquat fruits, this method grades the loquat fruits according to the average lignified cell density of the batch of loquat fruits, and sets the selling price accordingly. This method predicts the quality change trend of the batch of loquat fruits based on the growth stage of the lignified cells, and formulates the storage and logistics strategy of the batch of loquat fruits accordingly, so as to guide the sales strategy of the loquat fruits.

Preferably, step 3 may include: for an i-th lignified cell of the j-th sample, measuring an area $S_j^i$ of the lignified cell if the lignified cell is not round, and calculating an equivalent radius $R_j^i$ of the lignified cell based on $S_j^i = \pi R_j^{i2}$; determining that the lignified cell is a stage I lignified cell if a thickened cell wall of the lignified cell is not ring-shaped, and calculating a thickness r and an arc length l of the thickened cell wall and an entire circumference C of the lignified cell, $$D_j^i = \frac{r*l}{C};$$

determining that the lignified cell is a stage II lignified cell if the thickened cell wall of the lignified cell is ring-shaped, and directly measuring a thickness of the ring-shaped cell wall as $D_j^i$; and determining that the lignified cell is a stage III lignified cell if the lignified cell is thickened to be solid, $D_j^i = R_j^i$.

Stage I is an initial stage of lignified cells; stage II is a development stage of lignified cells; stage III is a final stage of lignified cells. If there are many lignified cells in stage I and stage II, the loquat fruits are in a stage of mass production of lignified cells, which indicates a high lignification trend, meaning a low T. If there are many lignified cells in stage II and stage III, there are no new lignified cells produced in a large number in the loquat fruits, which indicates a low lignification trend, meaning a high T.

Preferably, in step 4, the threshold of the lignified cell density per square centimeter may be 50≤P'≤100.

Preferably, in step 5, 0.6≤Q'≤0.9.

Preferably, step 7 may include:

step 7.1: setting M−1 intermediate values in an ascending order between 0 and P', namely $P^1, P^2, P^3 \ldots P^{M-1}$, where $P^0=0$, $P^M=P'$, $P^{m-1}<P\leq P^m$, 1≤m≤M; setting a current base price of the batch of loquat fruits as $Y_{base}=Y^m$, $Y^m>Y^{m+1}$, 1≤m≤M−1; and step 7.2: setting intermediate lignification trend values $T^1=0.9$ and $T^2=0.7$; determining that, when $T>T^1$, a lignification trend is low, and the loquat fruits are suitable for storage or long-distance transportation for 5-10 days; determining that, when $T^2<T\leq T^1$, the lignification trend is moderate, and the loquat fruits are suitable for storage or short-distance transportation for 2-5 days; and determining that, when $T\leq T^2$, the lignification trend is high, and the loquat fruits are suitable for sale as soon as possible.

According to a market price, M gradient prices are established. The loquat fruits correspond to the gradient prices based on P, and sold at $Y_{base}$. M should not be too large, preferably 3 or 4. The base price of the loquat fruits is divided into 3 to 4 grades.

Storage and transshipment strategies are developed in accordance with the lignification trend.

Preferably, step 7.2 may include: setting a price adjustment coefficient a when $T>T^1$, and setting a current actual price of the batch of loquat fruits as $Y_{actual}=a\times Y_{base}$; setting a price adjustment coefficient b when $T^2<T\leq T^1$, and setting a current actual price of the batch of loquat fruits as $Y_{actual}=b\times Y_{base}$; and setting a price adjustment coefficient c when $T\leq T^2$, and setting a current actual price of the batch of loquat fruits as $Y_{actual}=c\times Y_{base}$, where a>b>c, a>1, c<1. Regarding the difference in the lignification trend of the loquat fruits, when the batch of loquat fruits is sold directly, the coefficient of the actual price may be adjusted. Preferably, a=1.2-2, b=0.9-1.1, c=0.3-0.8.

Preferably, in step 1, a sampling ratio of the batch of loquat fruits may be 0.1% to 2%.

The present invention evaluates the current quality of loquat fruits based on the lignified cell density, and sets the selling price accordingly. The present invention predicts the quality change trend of the batch of loquat fruits based on the growth stage of the lignified cells, and formulates the storage and logistics strategy of the batch of loquat fruits accordingly, so as to guide the sales strategy of the loquat fruits.

BRIEF DESCRIPTION OF THE DRAWINGS

The present invention will be explained in detail below with reference to the accompanying drawings.

DETAILED DESCRIPTION OF THE EMBODIMENTS

The present invention will be further described below with reference to the specific embodiments and drawings.

Embodiment: A method for guiding a sales strategy of loquat fruits by evaluating and predicting quality of the loquat fruits includes the following steps:

Step 1: Randomly select X samples from a batch of loquat fruits, and sequentially number the X samples as 1, 2, 3, . . . , X.

Step 2: Cut a j-th sample along an equatorial plane, remove half of the fruit and a core, freeze and slice, stain with phloroglucinol, calculate a number $N_j$ of lignified cells in an entire slice of the equatorial plane, calculate a total area $S_j$ of the equatorial plane of pulp, and calculate a lignified cell density on the equatorial plane as $P_j=N_j/S_j$, where $S_j$ is in square centimeter.

Step 3: Calculate a radius $R_j^i$ and an equivalent cell wall thickness $D_j^i$ of the $N_j$ lignified cells of the j-th sample, $1\leq i\leq N_j$, and calculate a lignification trend value of the j-th sample, $$T_j = \sum_{i=1}^{N_j}\left(\frac{1}{N_j} * \frac{D_j^i}{R_j^i}\right).$$

Figure 5:
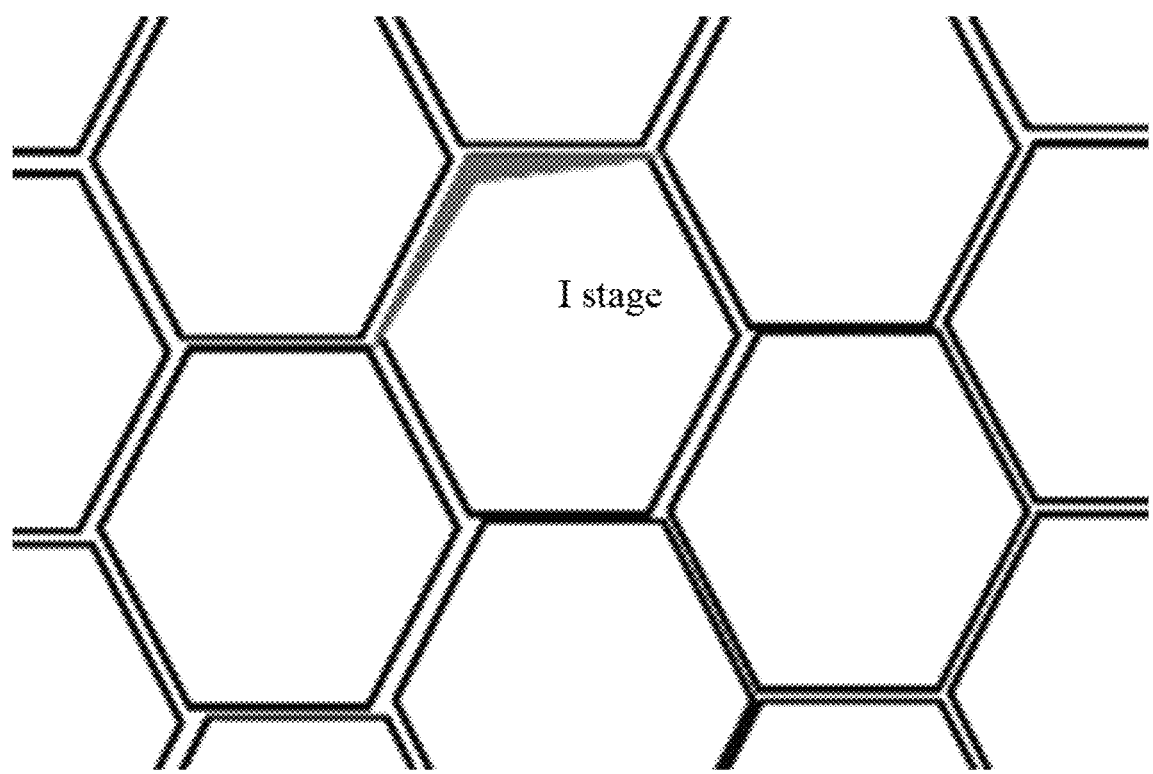
FIG. 5 shows a stage I lignified cell of an loquat fruit according to the present invention.
Figure 6:
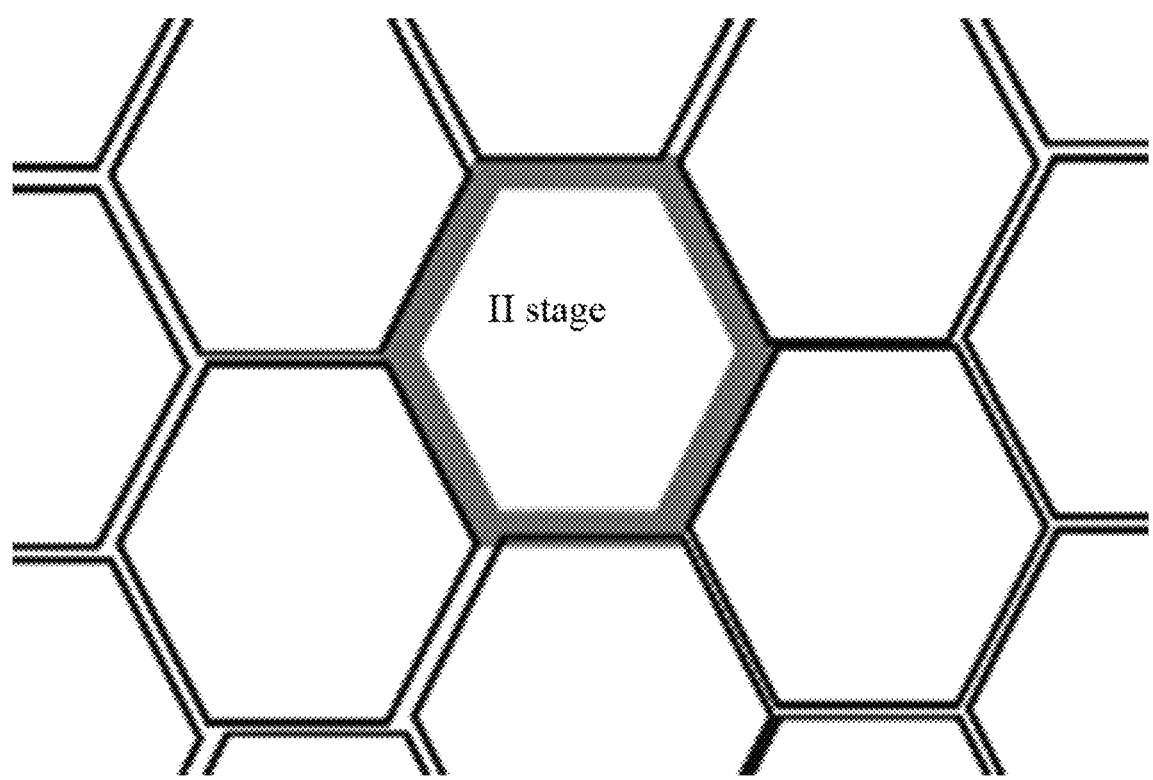
FIG. 6 shows a stage II lignified cell of an loquat fruit according to the present invention.
Figure 7:
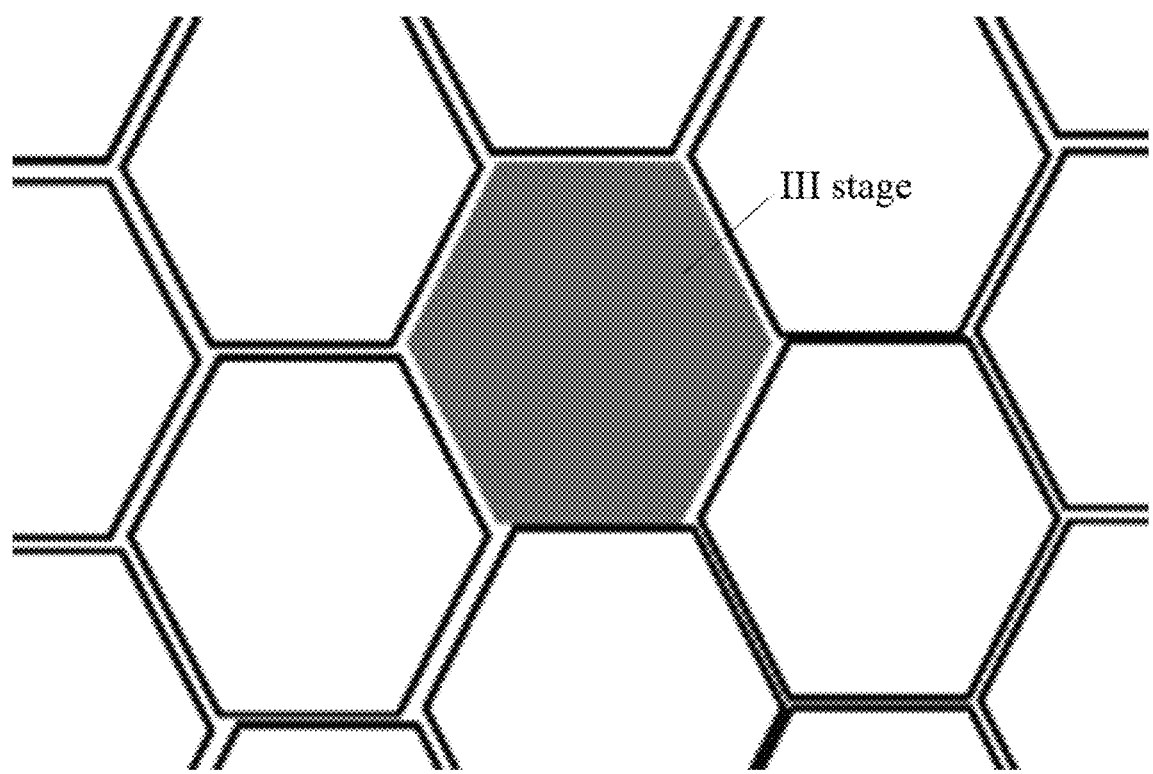
FIG. 7 shows a stage III lignified cell of an loquat fruit according to the present invention.

This step includes: for an i-th lignified cell of the j-th sample, measure an area $S_j^i$ of the lignified cell if the lignified cell is not round, and calculate an equivalent radius $R_j^i$ of the lignified cell based on $S_j^i=\pi R_j^{i2}$; determine that the lignified cell is a stage I lignified cell (FIG. 5) if a thickened cell wall of the lignified cell is not ring-shaped, and calculate a thickness r and an arc length l of the thickened cell wall and an entire circumference C of the lignified cell, $$D_j^i = \frac{r * l}{C};$$

determine that the lignified cell is a stage II lignified cell (FIG. 6) if the thickened cell wall of the lignified cell is ring-shaped, and directly measure a thickness of the ring-shaped cell wall as $D_j^i$; and determine that the lignified cell is a stage III lignified cell (FIG. 7) if the lignified cell is thickened to be solid, $D_j^i=R_j^i$.

Figure 1:
FIG. 1 is a micrograph of an loquat fruit with a lignified cell density $P_j\leq 20$ according to the present invention.
Figure 2:
FIG. 2 is a micrograph of an loquat fruit with a lignified cell density $20<P_j\leq 35$ according to the present invention.
Figure 3:
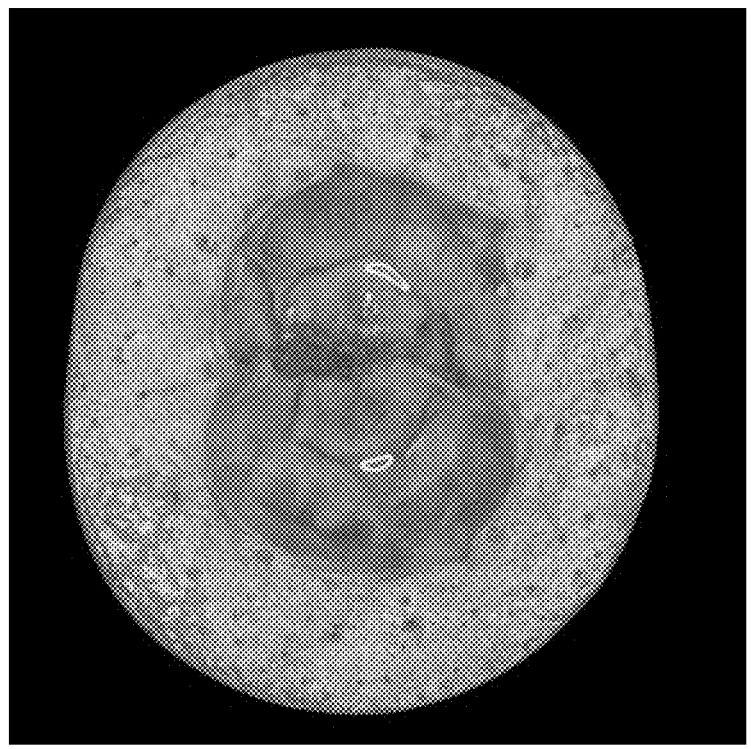
FIG. 3 is a micrograph of an loquat fruit with a lignified cell density $35<P_j\leq 50$ according to the present invention.
Figure 4:
FIG. 4 is a micrograph of an loquat fruit with a lignified cell density $P_j>50$ according to the present invention.

Step 4: Set a threshold P'=50 of the lignified cell density, calculate a number X' of samples with $P_j<50$, and calculate a qualified rate Q=X'/X of the batch of loquat fruits. FIG. 1 is a micrograph of an loquat fruit with $P_j\leq 20$, and this fruit is a superior fruit. FIG. 2 is a micrograph of an loquat fruit with 20<$P_j$≤35, and this fruit is a highly qualified fruit. FIG. 3 is a micrograph of an loquat fruit with 35<$P_j$≤50, and this fruit is a qualified fruit. FIG. 4 is a micrograph of an loquat fruit with $P_j$>50, and this fruit is an unqualified fruit.

Step 5: Set a qualified rate threshold Q'=0.8; determine that, if Q<0.8, the batch of loquat fruits is unqualified and not suitable for sale; and determine that, if Q≥0.8, the batch of loquat fruits is qualified, and proceed with the following steps.

Step 6: Calculate an average lignified cell density P=$\Sigma_{j=1}^{X}$(P$_j$/X) and an average lignification trend value T=$\Sigma_{j=1}^{X}$(T$_j$/X) of the batch of loquat fruits.

Step 7: Guide a current price of the batch of loquat fruits based on the average lignified cell density P, where the current price of the loquat fruits increases as P decreases; and guide a storage strategy based on T, where the loquat fruits are suitable for storage and transportation when T is high, and the loquat fruits need to be sold as soon as possible when T is low.

Step 7.1: Set two intermediate values in an ascending order between 0 and P', namely $P^1$=20 and $P^2$=35, where $P^0$=0, $P^3$=P'=50; and grade the loquat fruits based on 0<P≤20, 20<P≤35 and 35<P≤50, where current base prices of the batch of loquat fruits are $Y_{base}$=$Y^1$; $Y_{base}$=$Y^2$ and $Y_{base}$=$Y^3$ when 0<P≤20, 20<P≤35 and 35<P≤50, respectively, $Y^1$>$Y^2$>$Y^3$.

Step 7.2: Set intermediate lignification trend values $T^1$=0.9 and $T^2$=0.7; determine that, when T>$T^1$, a lignification trend is low, and the loquat fruits are suitable for storage or long-distance transportation for 5-10 days; determine that, when $T^2$<T≤$T^1$, the lignification trend is moderate, and the loquat fruits are suitable for storage or short-distance transportation for 2-5 days; and determine that, when T≤$T^2$, the lignification trend is high, and the loquat fruits are suitable for sale as soon as possible. This step includes: set a price adjustment coefficient a=1.5 when T>$T^1$, and set a current actual price of the batch of loquat fruits as $Y_{actual}$=1.5×$Y_{base}$; set a price adjustment coefficient b=1 when $T^2$<T≤$T^1$, and set a current actual price of the batch of loquat fruits as $Y_{actual}$=$Y_{base}$; and set a price adjustment coefficient 0.5 when T≤$T^2$, and set a current actual price of the batch of loquat fruits as $Y_{actual}$=0.5×$Y_{base}$.

What is claimed is:

1. A method of transporting loquat fruits for sale by evaluating and predicting quality of the loquat fruits, comprising the following steps:

step 1: randomly selecting X samples from a batch of loquat fruits, and sequentially numbering the X samples as 1, 2, 3, . . . , X;

step 2: cutting a j-th sample along an equatorial plane, removing half of the fruit and a core, freezing and slicing, staining with phloroglucinol, calculating a number $N_j$ of lignified cells in an entire slice of the equatorial plane, calculating a total area $S_j$ of the equatorial plane of pulp, and calculating a lignified cell density on the equatorial plane as $P_j$=$N_j$/$S_j$;

step 3: calculating a radius $R_j^i$ and an equivalent cell wall thickness $D_j^i$ of the $N_j$ lignified cells of the j-th sample, 1≤i≤$N_j$, and calculating a lignification trend value of the j-th sample, $$T_j = \sum_{i=1}^{N_j}\left(\frac{1}{N_j} * \frac{D_j^i}{R_j^i}\right),$$

wherein i is an i-th lignified cell of the j-th sample;

step 4: setting a threshold P' of the lignified cell density, calculating a number X' of samples with $P_j$<P', and calculating a qualified rate Q=X'/X of the batch of loquat fruits;

step 5: setting a qualified rate threshold Q' and when Q≥Q', the batch of loquat fruits is qualified, and proceeding with the following steps;

step 6: calculating an average lignified cell density P=$\Sigma_{j=1}^{X}$(P$_j$/X) and an average lignification trend value T=$\Sigma_{j=1}^{X}$(T$_j$/X) of the batch of loquat fruits;

step 7: grading the batch of loquat fruits according to the average lignification trend value, T, ordering one or more batches of loquat fruits from lowest to highest T values and processing the one or more batches of loquat fruits in order of lowest to highest T values to maximize overall shelf life; setting a transportation strategy based on T for a length of time the loquat fruits are transportable;

and transporting, based on T, the one or more batches of loquat fruits for 5-10 days when T>0.9 or for 2-5 days when 0.7<T≤0.9 to another producing area for sale before the one or more batches of loquat fruits perish, thereby preventing waste.

2. The method of transporting loquat fruits for sale by evaluating and predicting the quality of the loquat fruits according to claim 1, wherein step 3 comprises:

for an i-th lignified cell of the j-th sample, measuring an area $S_j^i$ of the i-th lignified cell when the i-th lignified cell is not round, and calculating an equivalent radius $R_j^i$ of the i-th lignified cell based on $S_j^i$=π$R_j^{i^2}$;

determining that the i-th lignified cell is a stage I lignified cell when a thickened cell wall of the i-th lignified cell is not ring-shaped, and calculating a thickness r and an arc length l of the thickened cell wall and an entire circumference C of the i-th lignified cell, $$D_j^i = \frac{r*l}{C};$$

determining that the i-th lignified cell is a stage II lignified cell when the thickened cell wall of the i-th lignified cell is ring-shaped, and directly measuring a thickness of the ring-shaped cell wall as $D_j^i$; and determining that the i-th lignified cell is a stage III lignified cell when the i-th lignified cell is thickened to be solid, $D_j^i$=$R_j^i$.

3. The method of transporting loquat fruits for sale by evaluating and predicting the quality of the loquat fruits according to claim 1, wherein in step 4, the threshold of the lignified of the lignified cell density per square centimeter is 50≤p'≤100.

4. The method of transporting loquat fruits for sale by evaluating and predicting the quality of the loquat fruits according to claim 1, wherein in step 5, 0.6≤Q'≤0.9.

5. The method of transporting loquat fruits for sale by evaluating and predicting the quality of the loquat fruits according to claim 1, wherein step 7 comprises:

setting M−1 intermediate values in an ascending order between 0 and P', namely $P^1$, $P^2$, $P^3$ . . . $P^{M-1}$, wherein $P^0$=0, $P^m$=P', $P^{m-1}$<P≤$P^m$, 1≤m≤M; setting a current base price of the batch of loquat fruits as $Y_{base}$=$Y^m$, $Y^m$>$Y^{m+1}$, 1≤m≤M−1.

6. The method of transporting loquat fruits for sale by evaluating and predicting the quality of the loquat fruits according to claim 1, wherein:

when T>0.9, a price adjustment coefficient a is used to set a current actual price of the batch of loquat fruits as $Y_{actual} = a \times Y_{base}$;

when 0.7<T<0.9, a price adjustment coefficient b is used to set a current actual price of the batch of loquat fruits as $Y_{actual} = b \times Y_{base}$; and when T≤0.7, a price adjustment coefficient c is used to set a current actual price of the batch of loquat fruits as $Y_{actual} = c \times Y_{base}$, wherein a>b>c, a>1, c<1.

7. The method of transporting loquat fruits for sale by evaluating and predicting the quality of the loquat fruits according to claim 1, wherein in step 1, a sampling ratio of the batch of loquat fruits is 0.1% to 2%.

* * * * *